United States Patent
Anhut et al.

(10) Patent No.: US 9,632,298 B2
(45) Date of Patent: Apr. 25, 2017

(54) LASER SCANNING MICROSCOPE WITH SWITCHABLE OPERATING MODE

(75) Inventors: Tiemo Anhut, Jena (DE); Thomas Kalkbrenner, Jena (DE); Daniel Schwedt, Welmar (DE)

(73) Assignee: Carl Zeiss Microscopy GmbH, Jena (DE)

( * ) Notice: Subject to any disclaimer, the term of this patent is extended or adjusted under 35 U.S.C. 154(b) by 210 days.

(21) Appl. No.: 13/825,722

(22) PCT Filed: Sep. 29, 2011

(86) PCT No.: PCT/EP2011/004873
§ 371 (c)(1),
(2), (4) Date: Mar. 22, 2013

(87) PCT Pub. No.: WO2012/041502
PCT Pub. Date: Apr. 5, 2012

(65) Prior Publication Data
US 2013/0182306 A1    Jul. 18, 2013

(30) Foreign Application Priority Data
Oct. 1, 2010    (DE) .................. 10 2010 047 353

(51) Int. Cl.
*G02F 1/03*    (2006.01)
*G02F 1/07*    (2006.01)
(Continued)

(52) U.S. Cl.
CPC ........... *G02B 21/06* (2013.01); *G02B 21/008* (2013.01); *G02B 21/0032* (2013.01);
(Continued)

(58) Field of Classification Search
CPC ..... G02F 1/0136; G02B 27/26; G02B 27/283; G02B 6/272; G02B 6/2773;
(Continued)

(56) References Cited

U.S. PATENT DOCUMENTS 6,028,306 A    2/2000 Hayashi
6,219,179 B1    4/2001 Nielsen et al.
(Continued)

FOREIGN PATENT DOCUMENTS

DE    198 29 981 A1    1/2000
DE    199 04 592 A1    9/2000
(Continued)

OTHER PUBLICATIONS

International Preliminary Report on Patentability (Chapter 1 of the Patent Cooperation Treaty).
(Continued)

*Primary Examiner* — Bumsuk Won
*Assistant Examiner* — Tamara Y Washington
(74) *Attorney, Agent, or Firm* — Duane Morris LLP

(57) ABSTRACT

A laser scanning microscope, which is switchable between different operating modes, wherein it contains, for switching in the illumination beam path, an electro-optical modulator (EOM) in a first beam path, which electro-optical modulator has arranged, upstream and downstream of it, adjustable first and second polarization-rotating elements and, downstream of it, at least one first polarization splitter for producing a second beam path, in which light-influencing means are located, wherein one or more of the following operating modes of the LSM can be set:—Single spot LSM—multi-spot LSM—single spot FMM—multispot FMM—FRAP system.

10 Claims, 4 Drawing Sheets

(51) Int. Cl.
*G02B 21/06* (2006.01)
*G02B 21/00* (2006.01)
*G02B 27/28* (2006.01)
*G02F 1/01* (2006.01)

(52) U.S. Cl.
CPC ....... *G02B 21/0076* (2013.01); *G02B 27/283* (2013.01); *G02F 1/0136* (2013.01)

(58) Field of Classification Search
CPC ... G02B 21/0032; G02B 21/008; H01J 37/28; H01J 37/20; C08L 67/02
USPC ...... 359/240–250; 250/307–311; 372/10, 27, 372/108
See application file for complete search history.

(56) References Cited

U.S. PATENT DOCUMENTS

| | | | |
|---|---|---|---|
| 6,469,822 B1* | 10/2002 | Zhu | G02F 1/292 349/202 |
| 7,583,438 B2* | 9/2009 | Tomita | G06N 99/002 359/240 |
| 2003/0030901 A1* | 2/2003 | Knebel | 359/388 |
| 2007/0201125 A1* | 8/2007 | Blau | G02F 1/3501 359/326 |
| 2007/0201616 A1* | 8/2007 | Rowlands | G02F 1/1354 378/98.2 |
| 2008/0111981 A1 | 5/2008 | Visser et al. | |
| 2009/0219960 A1* | 9/2009 | Uberna | G02B 27/1006 372/27 |
| 2010/0193481 A1 | 8/2010 | Osako | |
| 2015/0338631 A1* | 11/2015 | Matsumoto | G02B 21/082 359/316 |

FOREIGN PATENT DOCUMENTS

| | | |
|---|---|---|
| EP | 0 500 717 B1 | 9/1998 |
| EP | 1 720 052 A1 | 11/2006 |
| JP | 2001 091842 A | 4/2001 |
| JP | 2001 296469 A | 10/2001 |
| JP | 2007 127740 A | 5/2007 |
| JP | 2007 275908 A | 10/2007 |
| WO | WO 2009/008838 A1 | 1/2009 |
| WO | WO 2009/066253 A2 | 5/2009 |
| WO | WO 2011/116901 A2 | 9/2011 |

OTHER PUBLICATIONS

Sueda, K., et al.; "Laguerre-Gaussian beam generated with a multilevel spiral phase plate for high intensity laser pulses"; Optics Express Jul. 2004; 12(15): 3548-3553.

Chen, Nanguang, et al.; "Focal modulation microscopy"; Optics Express (2008); 16(23):18764-18769.

Wong, Chee Howe, et al.; "Simple spatial phase modulator for focal modulation microscopy"; Applied Optics Jun. 2009; 48(17):3237-3242.

Reits, Eric and Neefjes, Jacques; "From Fixed to FRAP: measuring protein mobility and activity in living cells"; Nature Cell Biology (2001); 3:E145-E147.

http://de.wikipedia.org/wiki/FRAP.

English translation of Notification of Reasons for Rejection.

* cited by examiner

FIG.3a
Phase modulation
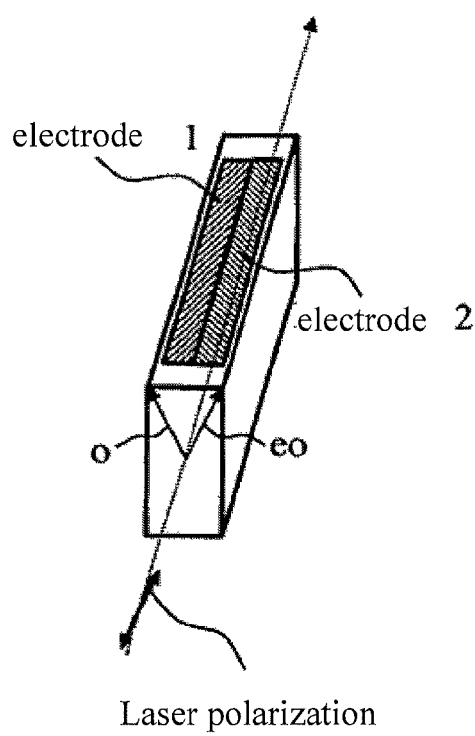
Beam profile (Phase):
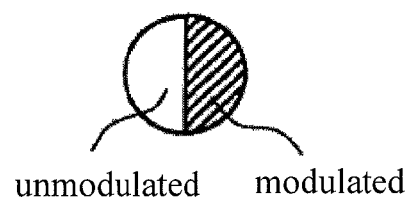
unmodulated    modulated
FIG.3b
Polarization switch
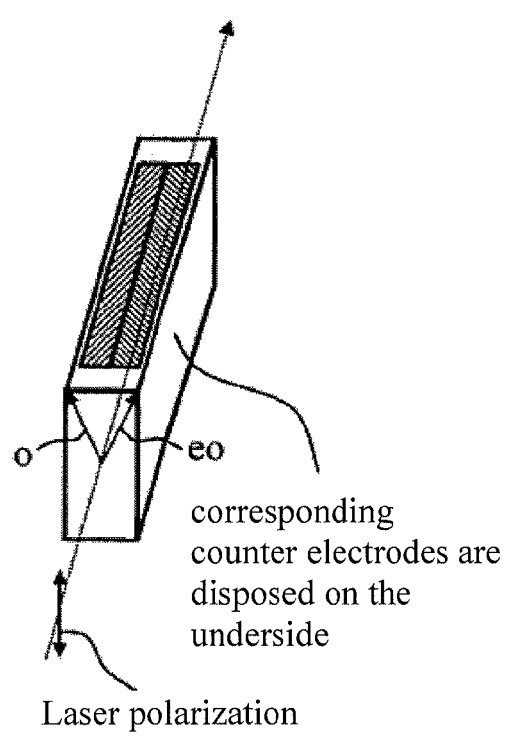
corresponding counter electrodes are disposed on the underside
Laser polarization
both electrodes operated in same phase with the same amplitude

LASER SCANNING MICROSCOPE WITH SWITCHABLE OPERATING MODE

RELATED APPLICATIONS

The present application is a U.S. National Stage application of International PCT Application No. PCT/EP2011/004873 filed on Sep. 29, 2011 which claims priority benefit of German Application No. DE 10 2010 047 353.7 filed on Oct. 1, 2010, the contents of each are incorporated by reference in their entirety.

FIELD OF THE INVENTION

The field of microscopy for biological samples, where demands vary—for example, microscopy in highly scattering media with limited penetrability, and/or living cell microscopy for the observation of dynamic processes, or the microscopic analysis of diffusion processes—presents high demands for flexibility with respect to the depth of penetration in scattering media, the preservation of the samples (bleaching, phototoxicity), image recording speed, and ROI (regions of interest) manipulation

PRIOR ART

References
[1] Chen et al., Opt. Express 16, 18764 (2008)
[2] Wong et al., Appl. Opt. 48, 3237 (2009)
[3] Sueda et al., Opt. Express 12, 3548 (2004)
[4] WO2009008838
[5] EP500717 Two-photon microscopy Two-Photon Microscopy (EP500717B2):

The disadvantages of this system are a very expensive laser system, the limited selection of dyes, and the specimen exposure.

FRAP (Fluorescence Recovery After Photobleaching):

In this case, a certain sample range is deliberately bleached out, and the recovery behavior thereof is subsequently detected over time. For this purpose, a single spot mode is required in order to irradiate a selected region of the sample in a targeted manner and with high intensity, up to the point when the sample is photobleached (see also DE 19829981A1).

The recovery of fluorescence by diffusion processes is then measured by the fastest possible imaging process. For this purpose, a rapid switch between the bleaching and imaging processes is advantageous because the gradient for recovery is the highest immediately after the end of the bleaching.

Focal Modulation Microscopy (FMM) as Disclosed in the Publications Items [1], [2] and [4] Above.

In FMM, half of the excitation laser beam (by diameter) is phase-modulated. Upon focusing with a microscope lens, this half-sided phase modulation leads to an intensity modulation in the focal volume. This intensity modulation can be detected behind a confocal pinhole, for example by means of lock-in detection. The advantage of the method is that only the ballistic—meaning, unscattered—photons contribute to this modulation signal if they generate a modulation of the light distribution in the focus, and this then leads to chronological intensity modulation of the signal photons. The photons which are, by way of example, scattered along multiple paths in highly scattering media lose the fixed phase relationship and do not contribute to the time-dependent interference structure in the focus, thereby also not contributing to the lock-in demodulated signal. In this way, the background is highly reduced by scattered light, and the depth at which it is possible to make a relatively precise image using a laser confocal microscope is then increased.

To date, mechanical approaches are used for the phase modulation of the half laser beam. In the reference identified above as item [1], the laser beam is deflected to a split mirror, half of which is moved relative to the other half via a piezo element.

In the reference identified above as item [2], half of the beam is directed through a glass pane which is disposed on a galvanometer-scanner. The phase of one half of the beam relative to the other is modulated by rotation of this pane.

The basic problem of all mechanical approaches is the low modulation rate, the same being restricted by the mechanical resonance frequency of the adjusting elements used (5-20 kHz for the systems described in references [1] and [2]).

Because a minimum number of modulation periods is required per pixel resting time for the lock-in detection process, the image acquisition rate is therefore highly restricted.

FMM can be advantageously used for laser scanning microscopy (LSM) in highly scattering media, and offers an alternative to multi-photon microscopy (see the references of item [5]).

The FMM solutions, as known at this time, are specifically designed for the modulation mode which is advantageous for the given penetration depth.

However, additional requirements exist for an LSM which can be used flexibly, particularly for use in live cell research, and these are partially very difficult to reconcile with the commonly available forms of LSM, particularly multi-photon microscopy. These primarily include image acquisition rate (for observation of dynamic processes) and specimen exposure (phototoxicity, bleaching during long-term observation of dynamic processes).

It is possible in principle to achieve an increase in the rate of image acquisition in LSM, for the observation of dynamic processes, by means of faster scanning—for example, with a resonance scanner. However, this is difficult to reconcile with the requirement of specimen preservation, because higher intensities are required for the generation of a sufficient fluorescence signal during the short pixel resting time.

Another option for increasing the image acquisition speed and/or reducing the specimen exposure is the simultaneous [sic] of multiple, spatially-distributed foci in a grid pattern (multi-spot LSM) (DE19904592 A1, U.S. Pat. No. 6,028,306) [sic]

OBJECT OF THE INVENTION

The features of the invention are set forth in the independent claims.

Preferred implementations are the subject matter of the dependent claims.

The solution provided according to the invention relates both to a concrete FRAP problem as well as to the rapid switching between alternative imaging modes, for which a rapid switching between beam paths is required, and wherein one of the beam paths can contain, but need not necessarily contain, a multi-spot generation.

DESCRIPTION OF THE DRAWINGS

FIGS. 3a and b show perspective views of the electro-optic modulator for the arrangement shown in FIG. 1.

DESCRIPTION OF THE EMBODIMENTS

Figure 1:
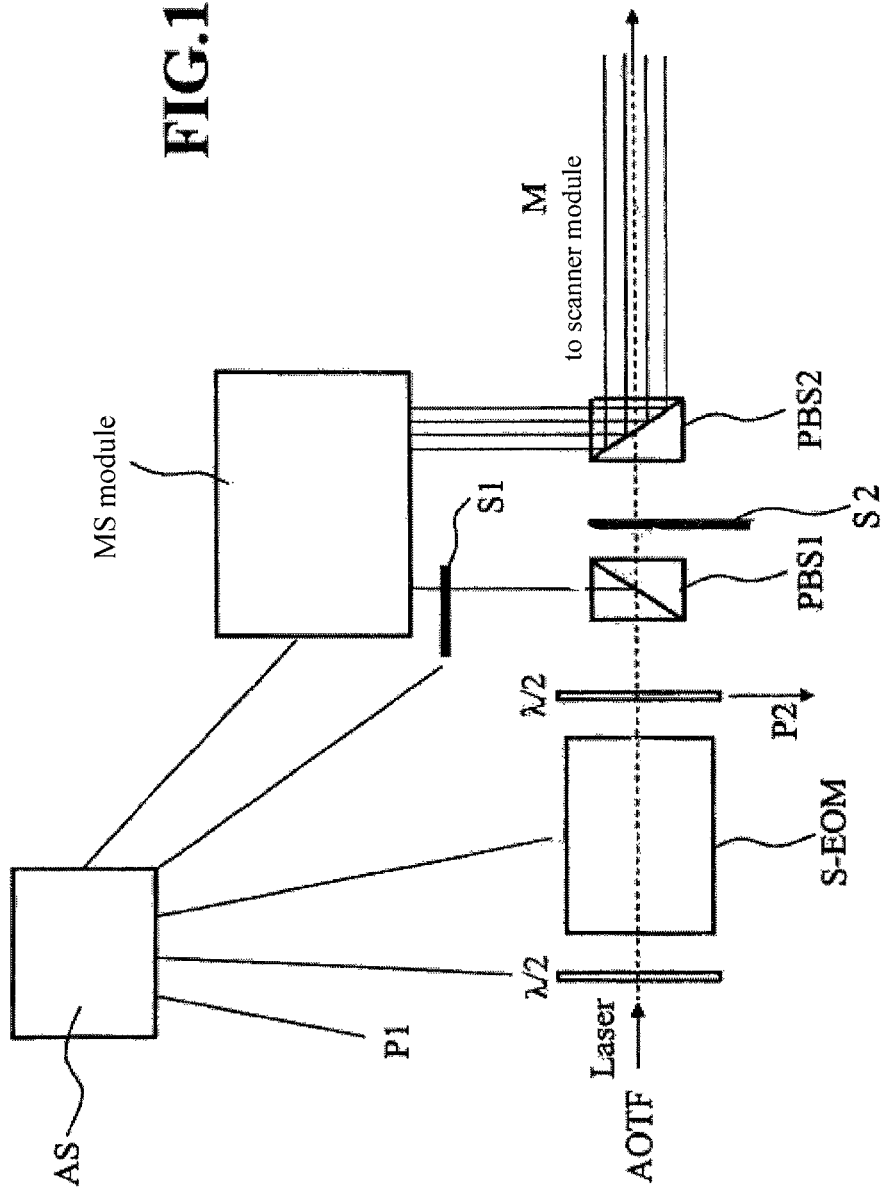
FIG. 1 shows an arrangement for beam switching and modulation for the flexible multimode approach of an LSM.

A schematic description of different advantageous embodiments according to the invention is given below, wherein:

FIG. 1 shows an arrangement for beam switching and modulation for the flexible multimode approach of an LSM. By means of a segmented EOM (s-EOM) described in greater detail in the figures and in the text, it is possible to operate a multimode-LSM as, by way of example: a single-spot LSM; a multi-spot LSM; a single-spot FMM; a multi-spot FMM; an FRAP system
and also to quickly switch back and forth between these operating states.

Figure 2:
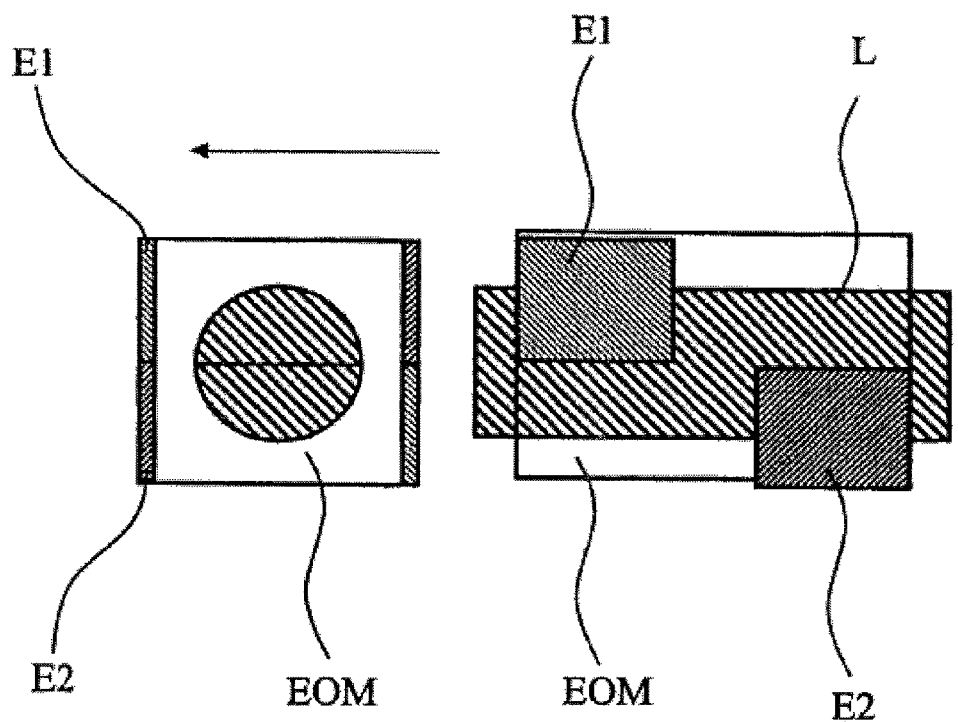
FIG. 2 schematically shows an EOM.
Figure 4:
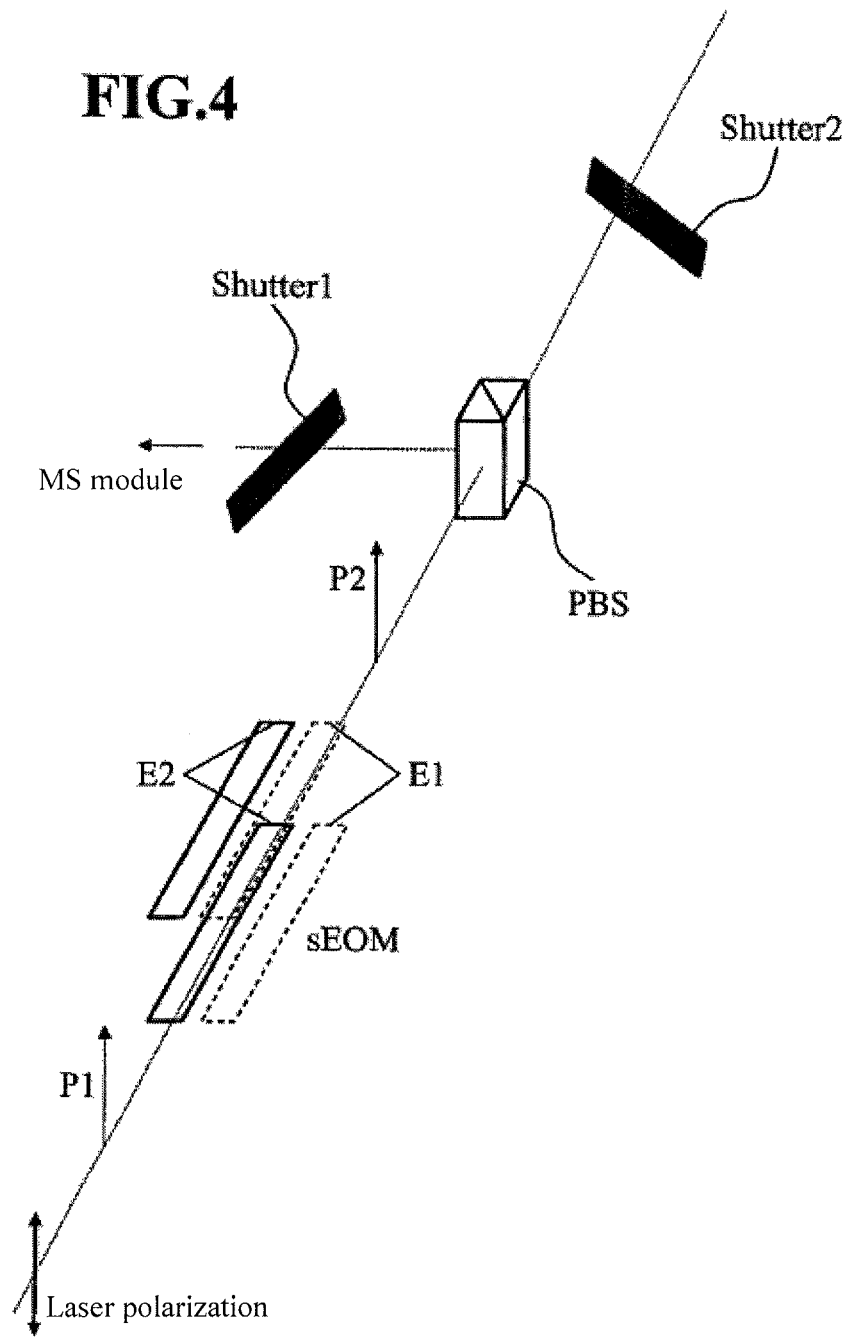
FIG. 4 is a schematic view.

An electro-optic modulator S-EOM is included in the beam path of the light source (laser), and this electro-optic modulator can be advantageously controlled as illustrated in FIG. 2.

λ/2 plates P1 and P2 are connected before and after the S EOM.

A polarizing beam splitter PBS1 follows the plate P2, and a further polarizing beam splitter PBS 2 is disposed behind PBS 1 in the direction of [the beam] passage.

A light lock S1, as well as an MS module for multi-spot generation using the laser beam, are included in the direction of reflection of PBS 1, wherein the laser beam is coupled to a scan module via the mirror of PBS 2 in the direction of the microscope M. In addition, it is also possible to advantageously arrange a second light lock S2 between both of the PBSs in the transmission direction.

The plates P1 and P2 are designed to be able to rotate (P1, P2) via a control unit AS, wherein P2 can additionally be designed to be able to pivot out.

The locks and the S-EOM are likewise connected to the control unit AS, the same controlling the switching between different operating modes.

The lock S1 serves the purpose—particularly in single-spot (LSM, FMM) mode—of completely preventing light from arriving at the sample via the MS module and PBS 2, which would produce light ghost images. The lock S2 serves to prevent overweight of one of the partial beams during multi-spot operation resulting from mis-polarized laser light bleeding through the two PBSs, which would cause uneven image brightness with hard transitions (strips).

By way of example, operating modes of the individual elements are listed in a Table T1, for the operating modes of a laser scanning microscope mentioned above.

| Operating mode | P1 (angle to laser polarization) | E1 (V) | E2 (V) | P2 (angle to P1) | Shutter 1 | Shutter 2 |
|---|---|---|---|---|---|---|
| 1. single-spot LSM | 0° | 0V | 0V | 45° | Closed | Open |
| 2. multi-spot LSM | 0° | 0V | 0V | 0° | Open | Closed |
| 3. single-spot FMM*) | 22.5° | Modulated | 0V | 45° | Closed | Open |
| 4. multi-spot FMM*) | 22.5° | Modulated | 0V | 0° | Open | Closed |
| 5. FRAP bleaching | 0° | Half-wave voltage | Half-wave voltage | 0° | Open | Open |

The term half-wave voltage indicates the operating voltage of the EOM for the laser wavelength used, said operating voltage causing a deceleration of the extraordinary polarized fraction of the laser light by a half wavelength, and thereby leading to a polarization shearing of 90 degrees.

The zero degrees and 22.5 degrees for P1 refer to the angle between an assumed linear orientation of the polarization of the incident laser beam—which the same undergoes, by way of example, [upon passing] through an upstream AOTF, wherein said linear orientation can be perpendicular, for example—and the extraordinary crystal axis of the half-wave plate.

It can likewise be contemplated, during operation of the focal modulation (3 and 4), that the electrode E2 is modulated instead of E1.

For the individual operating modes according to Table T1, the following beam path profile therefore results for the laser beam via the elements illustrated in FIG. 1:
1. Via P1, EOM, P2, PBS1, S2, PBS2 in direction M
2. Via P1, EOM, P2, PBS1, S1, MS, PBS2, M
3. Via P1, EOM, P2, PBS1, S2, PBS2, M
4. Via P1, EOM, P2, PBS1, S1, MS, PBS2, M
5. Via P1, EOM, P2, PBS1, S2, PBS 2, M According to the invention, EOMs in FMM mode are used for a particularly rapid, non-mechanical phase modulation of at least a fraction, and preferably half, of the excitation beam.

They are variably modulated (out of phase) by counter-pole control of fractions of the EOM, or multiple EOMs.

In the case of fractions of an EOM controlled variably, insulation layers as known to a person skilled in the art can be used to prevent a mutual influence between the segmented electrodes.

Electro-optic modulators exploit the Pockels effect in a birefringent crystal, wherein the extraordinary refraction index thereof is altered upon the application of a voltage to the crystal. This can be used to manipulate the polarization or the phase of the laser light passing through the crystal. The Pockels effect occurs almost instantaneously, whereby the modulation occur [sic] very quickly according to the type and size of the crystal (up to tens of MHz).

Embodiments which can be used advantageously for FMM microscopy are described below:

An EOM is schematically illustrated in FIG. 2, having opposing fields E1, E2 generated by electrodes disposed next to each other or staggered opposite each other.

A fundamentally important advantage of all EOM-based solutions is the highest possible modulation rate of tens of MHz.

The EOM is disposed, as derived from [1,2], in the illumination beam path, and advantageously in an expanded (collimated) beam segment.

The size of the beam expansion can be used for matching the beam cross-section to the size of the crystal.

At left in FIG. 2, two beam halves one upper and one lower—are modulated differently by means of electrodes with opposite poles in the upper and lower parts.

The modulated segments can be superimposed in the laser beam, but need not be so.

A side view (in the direction of the arrow in the left part) is given in schematic illustration in the right part of FIG. 2, wherein the controlled segments are advantageously staggered with respect to each other.

This can be advantageous for the prevention of leakage fields (high voltages are required for EOM).

A design using opposite poles can be advantageous, for example if the crystal is not intended to be modified, but rather the intention is to prevent cross-talk effects from one side to the other. The opposite-phased control {approach} also advantageously doubles the peak separation (distance between the opposite amplitudes) compared to single-phase control. As such, it would also be possible to advantageously shorten the crystal (shortened path) at a given phase difference (peak).

In addition, the staggered arrangement of the controlled regions of the EOM also enables an overlapping of the two beam regions (beyond the halves).

Use for Multimode Switching

As explained below, the EOM can be surprisingly and advantageously used in a further operating mode in the same arrangement for operation in a single-spot variant—preferably for FRAP.

FIGS. 3a and b show perspective views of the electro-optic modulator for the arrangement shown in FIG. 1.

The electrodes 1 and 2 used to generate the electric alternating field have their corresponding counter electrodes on the underside of the crystal (not shown in the illustration for reasons of simplicity).

The EOM is an EOM with segmented electrodes, with ordinary and extraordinary axes perpendicular to each other and perpendicular to the optical axis, and oriented at 45° to the axis of the electric field, as indicated in the figure. This has the following effect on linear polarized laser light:

laser polarization along the extraordinary crystal axis=>The laser light undergoes a delay (path travel delay) according to the field strengths present at the electrodes, due to the Pockels effect laser polarization at 45° to the (extra)ordinary crystal axes=>Light is evenly distributed in the (extra)ordinary directions of propagation. According to the voltages present at the electrodes (delay of the extraordinary propagating fraction), a new polarization makeup is introduced upon the superimposition of both fractions at the exit of the crystal—for example, rotated linearly at 90° with a half-wave delay, or circularly with a quarter-wave delay.

For the FMM operating mode (see FIG. 3a), the laser polarization is introduced along the fast crystal axis of the EOM (eo, extraordinary axis); this orientation can be set by the first lambda/2 plate P1 upstream of the S-EOM, said plate being able to rotate, as in FIG. 1. Accordingly, no polarization rotation occurs, but rather there is a modulation of the phase of the half beam, or an opposite-phase modulation of both halves in the EOM, as required for FMM.

By means of rotating the second lambda/2 plate P2 (behind the S-EOM), and according to PBS 1, it is possible to select whether the laser power is routed via the multi-spot module (for multi-spot FMM) or directly to the scanning head/microscope (for single-spot FMM).

At this point, if the first lambda/2 plate P1 upstream from the S-EOM is rotated in such a manner that the laser polarization makes a 45° angle to the (extra)ordinary crystal axes (FIG. 3b), and if the segmented electrodes are controlled with the same phase such that no phase difference is present between the two beam halves, then the EOM functions as a polarization switch which switches the polarization very quickly, for example between horizontal and vertical, for example via a controller with a square-wave voltage—meaning that the EOM determines whether light is transmitted through the PBS or is reflected by the same—wherein for this operating mode, the second lambda/2 plate is removed from the beam path, or is oriented in such a manner that its fast axis is parallel to one of the preferential axes of the following PBS. In this operating mode, the system can be advantageously used for FRAP: the rapid switching enables targeted bleaching of any ROIs (Region of Interest, DE 19829981A1) in combination with the scanner.

In addition, the advantageous and attractive combination for live cell imagining of multi-spot LSM for fast observation and single-spot manipulation is also possible: after a manipulation event in the straight path (Table T1, row 5), a rapid series of observation scans can be carried out in multi-spot LSM mode (Table T1, row 2); in this way, the dynamic event (for example, the uncaging of dyes) triggered by the manipulation can be observed with greater time resolution.

The invention is not bound by the illustrated processes.

Rather, the invention can be used in applications by a person skilled in the art for switching between various different operating modes which can be advantageously used either in pairs, or in multiple combinations.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A laser scanning microscope which can be switched between different operating modes, comprising
a control unit,
an electro-optic modulator (EOM) located in a first beam path of an illumination beam, for the purpose of switching said operating modes, said EOM comprising one of (i) segmented electrodes differently modulatable by said control unit, and (ii) multiple EOM's that are differently modulatable by said control unit,
an adjustable first polarization rotating element disposed in said first beam path before said EOM, and an adjustable second polarization rotating element disposed behind said EOM, and
at least a first polarization beam splitter disposed behind said second polarization rotating element for the purpose of generating a second beam path, wherein light-influencing means are disposed in said second beam path, said first polarization rotating element being adjustable by said control unit to an operating mode of said EOM.

2. A laser scanning microscope according to claim 1, wherein the first polarization rotating element is adjusted by the control unit in, accordance with the EOM operating mode.

3. A laser scanning microscope according to claim 1, wherein a unification of the first and second beam paths is realized via a second polarization splitter behind the light-influencing means in the direction of light travel, and the EOM can be switched between at least two operating modes for (i) uniform switching of the polarization across the illumination beam; and (ii) different modes of phase modulation in different sections of the illumination beam, to generate a focus modulation (FMM).

4. A laser scanning microscope according to claim 1, wherein the first and second polarization rotating elements are lambda half plates.

5. A laser scanning microscope according to claim 1, wherein the light-influencing means include a beam splitting into at least two partial beams.

6. A laser scanning microscope according to claim 1, wherein the partial beams form an angle relative to each other.

7. A laser scanning microscope according to claim 3, wherein a controllable light shutter is included in the second beam path upstream of the light-influencing means and/or in the first beam path between the first and second polarization splitter.

8. A method for laser scanning microscopy using a laser scanning microscope (LSM) according to claim 1, wherein at least two of the following operating modes of the LSM are used sequentially by adjusting the polarization rotating elements or the operating mode of the EOM: (i) single-spot LSM; (ii) multi-spot LSM; (iii) single-spot FMM; (iv) multi-spot FMM; (v) fluorescence recovery after photobleaching (FRAP) system.

9. A method according to claim 8, wherein a switching between the operating modes occurs in such a manner that a switching to multi-spot mode of the LSM takes place immediately following a bleaching process, or another, preferably single-spot, manipulation of a specimen region.

10. A microscope according to claim 1, wherein said second polarization rotating element is adjustable to at least one of said first and said second beam paths.

* * * * *

UNITED STATES PATENT AND TRADEMARK OFFICE
CERTIFICATE OF CORRECTION

PATENT NO. : 9,632,298 B2
APPLICATION NO. : 13/825722
DATED : April 25, 2017
INVENTOR(S) : Tiemo Anhut, Thomas Kalkbrenner and Daniel Schwedt It is certified that error appears in the above-identified patent and that said Letters Patent is hereby corrected as shown below:

On the Title Page

Inventors, Line 3: delete "Schwedt, Welmar (DE)" and insert --Schwedt, Weimar (DE)--

In the Specification

Column 1, Line 59: delete "the ballistic -meaning, unscattered- photons contribute to"
and insert --the ballistic -(meaning, unscattered)- photons contribute to--

Column 5, Line 1: delete "At left in FIG. 2, two beam halves one upper and one"
and insert --At left in FIG. 2, two beam halves -one upper and one--

Column 5, Line 15: delete "side to the other. The opposite-phased control {approach}"
and insert --side to the other. The opposite-phased control approach--

In the Claims

Column 6, Line 66: delete "the control unit in, accordance with the EOM operating"
and insert --the control unit in accordance with the EOM operating--

Column 7, Line 11: delete "wherein the first and second polarization rotating elements"
and insert --wherein the polarization rotating elements--

Signed and Sealed this
Third Day of October, 2017

Joseph Matal
*Performing the Functions and Duties of the*
*Under Secretary of Commerce for Intellectual Property and*
*Director of the United States Patent and Trademark Office*